United States Patent [19]

Sharp

[11] Patent Number: 4,503,580
[45] Date of Patent: Mar. 12, 1985

[54] WIPER BLADE COUPLING STRUCTURE

[75] Inventor: Bernard C. Sharp, White Plains, N.Y.

[73] Assignee: Parker-Hannifin Corporation, Shelton, Conn.

[21] Appl. No.: 526,599

[22] Filed: Aug. 26, 1983

[51] Int. Cl.³ .............................................. B60S 1/40
[52] U.S. Cl. ................................................ 15/250.32
[58] Field of Search ......................... 15/250.32–250.42

[56] References Cited

U.S. PATENT DOCUMENTS

| | | | |
|---|---|---|---|
| 3,866,260 | 2/1975 | Cone | 15/250.32 |
| 3,928,887 | 12/1975 | Lopez et al. | 15/250.32 |
| 4,007,511 | 2/1977 | Deibel | 15/250.42 |
| 4,209,874 | 6/1980 | Hancu | 15/250.32 |
| 4,214,343 | 7/1980 | Dudek | 15/250.32 |
| 4,389,746 | 6/1983 | Kimber | 15/250.32 |

*Primary Examiner*—Peter Feldman
*Attorney, Agent, or Firm*—Albert C. Johnston

[57] ABSTRACT

A windshield wiper blade holder for attachment to a wiper arm of the side mounting type comprises a primary yoke member having a rigid central portion formed with a socket extending transversely through it to receive a side pin on the end of the wiper arm, and formed in and along its under side with a recess having fitted thereinto a resilient latch member which is formed as a unitary molding of a tough polymeric material and is assembled simply by being pressed into the recess until protrusions at one end of the latch member are anchored in a pocket to one side of the socket. A block-like abutment portion of the latch member is held resiliently in a cavity across the socket so that the abutment portion can be displaced downward by an arm side pin thrust into the socket and then will engage in a groove of the side pin to couple the blade holder with the wiper arm. An up-standing finger on the other end of the latch member extends through a passageway to the upper side of the yoke member and can be pressed downward to depress the abutment portion out of the groove of the side pin, thus enabling removal of the blade holder from the wiper arm.

3 Claims, 5 Drawing Figures

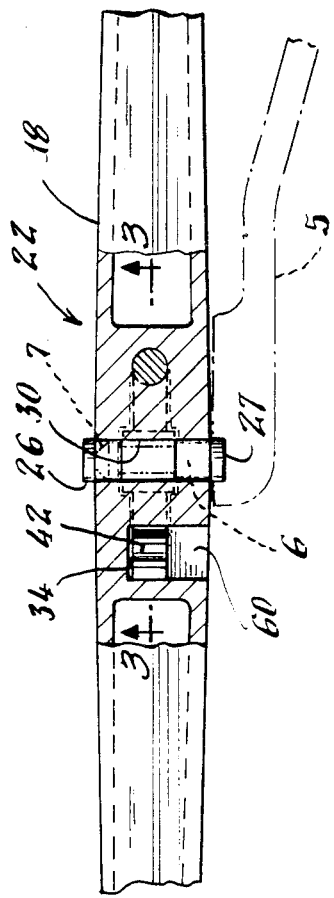
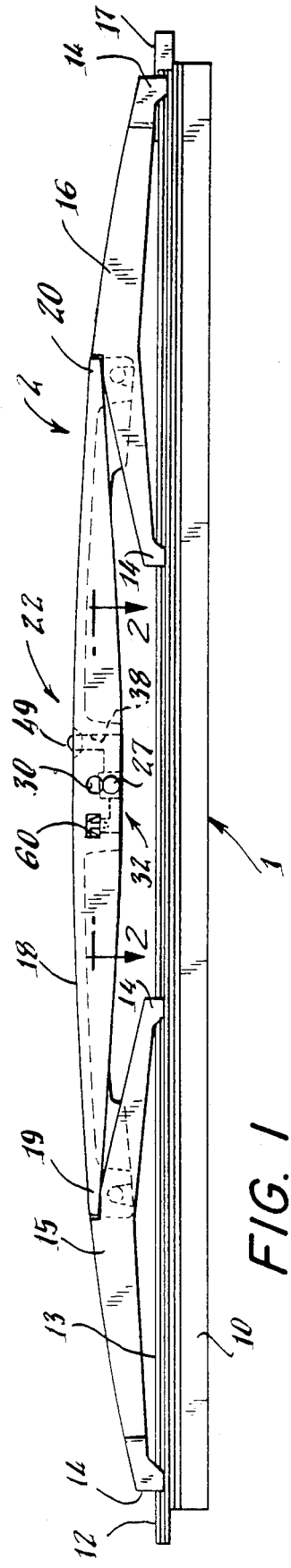
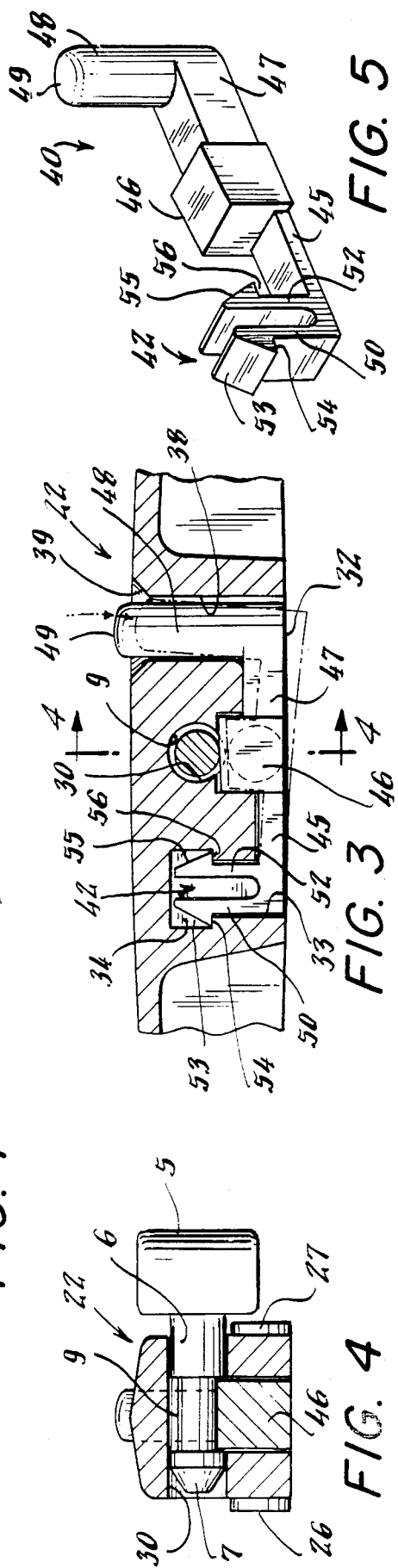

WIPER BLADE COUPLING STRUCTURE

The present invention relates to windshield wipers and, more particularly, to a wiper blade pressure distributor, or blade holder, provided with an improved structure for coupling this component, and thus a wiper blade assembly, securely to a windshield wiper arm of the common side mounting type. The same blade holder may also be provided with means of known form for coupling it, alternatively, with a wiper arm of the common bayonet mounting type.

Wiper arms of the side mounting type carry a grooved pin protruding to one side of the arm end for coupling the arm with the primary yoke of a blade holder provided with structure to receive and latch the side pin. Such wiper arms are used on automobiles to provide a low silhouette for the wipers on a windshield, or where a recess in the hood at the base of the windshield receives the wipers when they are not in use.

U.S. Pat. No. 3,928,887 discloses a windshield wiper blade holder having in a central portion of its primary yoke a transverse socket to receive the side pin of a wiper arm end of the side mounting type, from which socket slits extend along the central portion so that upper and lower sections of it are elastically displaceable one from the other. Such a coupling structure is not completely satisfactory under the exacting conditions of use, or of possible abuse, which apply to automobile windshield wipers. The coupling can in some uses exhibit instability under stress, due to the elasticity and consequent mobility of the slit central portion of the primary yoke.

The principal object of the present invention is to provide an improved coupling structure for a windshield wiper blade holder, by which the blade holder can be fastened quite stably and securely, yet with easy detachability, to a windshield wiper arm of the side mounting type.

The wiper blade holder for which the present invention is suited is generally similar to known blade holders in that it comprises a primary yoke having means on a central portion thereof for coupling it with a wiper arm end, and comprises secondary yokes which are carried pivotably on the ends of the primary yoke and are formed with claws for slidably holding a flexible wiper blade unit, or blade refill, in working relation to the blade holder.

According to the present invention, the central portion of the primary yoke is made quite rigid, and the arm coupling means comprises a socket extending transversely through the central portion to receive slidably the side pin of the wiper arm, an elongate recess formed in and along the under side of the central portion and a resilient latch member which is formed as a unitary molding of a tough polymer material and is assembled in working position simply by fitting it into the elongate recess. The recess comprises a pocket inside the central portion to one side of the side pin socket and a cavity extending across the socket. The latch member comprises on an end thereof anchor means extending into and engaging with the pocket to anchor the latch member in place, and an abutment portion of the latch member is resiliently held seated in the cavity, is displaceable elastically out of the socket by a side pin pressed into the socket and then is reseatable by the resilience of the latch member to engage in the groove of the side pin and thus couple the blade holder with the wiper arm.

The foregoing and other objects, features and advantages of the invention will be further apparent from the following detailed description and the accompanying drawing of an illustrative embodiment of the invention. In the drawing:

FIG. 1 is a side elevational view of a windshield wiper blade holder provided with a coupling structure embodying the invention, as assembled with a wiper blade unit;

FIG. 2 is a longitudinal sectional view through the central portion of the primary yoke of the blade holder, taken at line 2—2 of FIG. 1 with the side pin of a wiper arm of the side mounting type shown coupled to the yoke;

FIG. 3 is an enlarged longitudinal sectional view taken at line 3—3 of FIG. 1;

FIG. 4 is a transverse sectional view taken at line 4—4 of FIG. 3; and

FIG. 5 is an enlarged perspective view of the latch member of the coupling structure.

The wiper blade assembly shown in FIG. 1 comprises a replaceable blade unit 1 of known type mounted in working position on a blade holder 2 according to the invention. The blade unit 1 includes a rubber wiping element, or squeegee 10, having an upper or head portion of its body held in a channel of a flexible backing strip 12. The backing strip 12 has laterally protruding flanges 13 which are held slidably in claws 14 formed on the ends of secondary yokes 15 and 16 of the blade holder. A suitable fastening or clip device 17 prevents the blade unit 5 from sliding out of the claws in use.

The secondary yokes 15 and 16 are connected at locations between their ends for limited pivotal movement relative to the ends 19 and 20 of a primary yoke 18. Each yoke component of the blade holder is a unitary molding of a suitably strong and rigid polymer composition, such, for example, as a polyester resin impregnated with glass fiber. A central portion 22 of the primary yoke 18 is provided at its opposite sides with integrally molded short cylindrical pivot posts 26 and 27 which protrude laterally so as to be interengagable with a straddling connector (not shown) for coupling it with the bayonet end of a wiper arm of the conventional bayonet mounting type. Such a connector for assembly with such pivot posts is disclosed, for instance, in U.S. Pat. No. 3,928,887.

For coupling the blade holder 2 with a wiping arm of the side mounting type, the central portion 22 of the primary yoke 18 is formed with a socket 30 extending transversely through it for receiving slidably the side pin 6 of a side mounting wiper arm 5, and an elongate recess 32 is formed in and along the under side of central portion 22 to receive and coact with a resilient latch member 40 fitting in the recess 32. Latch member 40 is also a unitary molded element composed, e.g., of a tough thermoplastic composition such as an acetal resin homopolymer known as Delrin 507.

The recess 32 comprises a pocket 34 inside the central portion 22 at a location to one side of the socket 30 and a cavity 36 that extends across a lower portion of the socket 30. At a location to the opposite side of socket 30, the recess comprises a passageway 38 extending through the central portion 22 to its upper side, where passageway 38 preferably opens into a widened end portion 39. The pocket comprises a mouth portion 33 leading into a wider pocket chamber at 34.

The resilient latch member 40 in the illustrated form comprises an anchor means 42 on one end thereof, which extends into and engages with a wall of the pocket 34 to anchor the latch member in place, and an abutment portion 46 which normally is seated in the cavity 36. The abutment portion 46 is an upwardly projecting block formation of substantially rectangular configuration, and is displaceable elastically downward by the camming action of the end 7 of a wiper arm side pin 6 pressed into the socket 30. Then, when the groove 9 of the side pin reaches a centered position in socket 30, the abutment portion 46 is reseated by the resilience of the latch member so as to engage into the groove 9, as illustrated in FIG. 3 and FIG. 4, and thus latch the side pin and its wiper arm 5 in coupled relation to the primary yoke 18.

The latch member 40 further comprises a protruding portion 48 which is movable to displace the abutment portion 46 elastically out of the groove 9 and thus free the side pin 6 so that the blade holder can be removed from the wiper arm. Such removal may be desired either for replacing a used wiper blade and blade holder assembly by a new one or to facilitate replacement on the same blade holder of a used wiper blade unit by a blade refill unit.

The protruding portion 48 here illustrated has the form of an upstanding cylindrical finger on the end of latch member 40 remote from the anchor means 42. The finger 48 extends through the passageway 38 and into the widened opening at 39 where the upper end 49 of the finger is accessible to be pressed downward for releasing a side pin 6 latched in the socket 30.

The protruding portion 48 of latch member 40 is connected with the abutment portion 46 by a substantially rigid arm portion 47 so that portions 46 and 48 are kept in the same relative position and are displaceable together by downward pressure on either of them. The abutment portion 46 is connected with the anchor means 42 by a resilient arm portion 45 of the latch member. This arm portion is elastically deflectable downward, with displacement of portion 46 from the cavity 36, either by the cam action of the end 7 of an arm side pin 6 pressed into the socket 30 or by a downward pressing on the upper end 49 of finger 48.

The anchor means 42 holds the end of the resilient arm portion 45 securely in a fixed position relative to the pocket 34 in central portion 22 of the primary yoke 18. Anchor means 42 in the form shown comprises two resilient upward protrusions 50 and 52 which are spaced apart on and project upwardly from the end of arm portion 45 so as to fit tightly in the pocket mouth portion 33. The upper end of each protrusion 50, or 52, is formed at its outer side with an end surface 53, or 55, sloped downward and outward toward a ledge 54, or 56, lying under the sloped surface. The ledges 54 and 56 engage against a wall of the pocket chamber bordering the mouth portion 33, thus anchoring the protrusions 50 and 52 in the recess pocket 34 so that the latch member 40 is held fast to central portion 22, and immovably except by limited downward displacement of portions 46 and 48 with elastic deflection of the resilient arm portion 45.

The latch member 40 is assembled with the primary yoke 18 simply by placing member 40 in recess 32 so that finger 48 extends into passageway 38 and the ends of the protrusions 50 and 52 lie in the mouth portion 33 of pocket 34, and then pressing on member 40 so as to move the sloped end surfaces 53 and 55 along mouth portion 33 and into the pocket chamber at 34. During such movement, the protrusions 50 and 52 are elastically converged by forced convergence of their sloped end surfaces, and when the end surfaces are fully inside the pocket chamber the protrusions are moved apart by their own resilience, thus latching their ledges 54 and 56 firmly over the pocket wall bordering mouth portion 33.

There normally will be no need or occasion for removing the latch member 40 from the primary yoke 18 after these elements of the blade holder are assembled together. For utilization in the event of such need, however, central portion 22 of the primary yoke may be provided with an opening 60 extending from one side thereof into the pocket chamber at 34. The latched ends of the protrusions 50 and 52 are accessible through the opening 60, as by inserting a slender tool through it, so that the protrusion ends may be converged to disengage their ledges 54 and 56 from the pocket wall and thus free the latch member for removal from the recess 32.

I claim:

1. A windshield wiper blade holder including a primary yoke having means on a central portion thereof for coupling it with a windshield wiper arm;

said central portion being quite rigid;

said coupling means comprising a socket extending transversely through said central portion to receive slidably the side pin of a wiper arm end of the side mounting type, an elongate recess formed in and along the under side of said central portion, said recess comprising a pocket inside said central portion to one side of said socket and a cavity extending across said socket, and a resilient elongate latch member formed as a unitary molding of a tough polymeric material and fitting in said recess;

said latch member comprising anchor means on an end thereof extending into and engaging with a wall of said pocket to anchor the latch member in place and an abutment portion which is normally seated in said cavity, is displaceable elastically by said side pin pressed into said socket and is reseatable by the resilience of said latch member to engage in a groove of said side pin; said latch member further comprising a protruding portion movable to displace said abutment portion elastically out of said groove to free said side pin for removal of the blade holder from the wiper arm, a resilient arm portion connecting said abutment portion with said anchor means and a rigid arm portion connecting said abutment portion with said protruding portion so that by downward pressure on said protruding portion said resilient arm portion is elastically deflectable downward with displacement of said abutment portion from said cavity;

said pocket comprising a mouth portion leading into a wider chamber thereover;

said anchor means comprising resilient upward protrusions spaced apart on said latch member end and formed at their outer sides with end surfaces sloped toward ledges thereunder, said protrusions being convergeable elastically by forced movement of said sloped end surfaces into said mouth portion and being anchored in said chamber by engagement of said ledges against a wall of said chamber bordering said mouth portion.

2. A wiper blade holder according to claim 1, said central portion having in one side thereof an opening extending into said chamber and through which the ends of said protrusions are accessible for converging them to free said latch member for removal from said recess.

3. A windshield wiper blade holder including a primary yoke having means on a central portion thereof for coupling it with a windshield wiper arm;

said central portion being quite rigid;

said coupling means comprising a socket extending transversely through said central portion to receive slidably the side pin of a wiper arm end of the side mounting type, an elongate recess formed in and along the under side of said central portion, said recess comprising a pocket inside said central portion to one side of said socket and a cavity extending across said socket, and a resilient elongate latch member formed as a unitary molding of a tough polymeric material and fitting in said recess;

said latch member comprising anchor means on an end thereof extending into and engaging with a wall of said pocket to anchor the latch member in place and an abutment portion which is normally seated in said cavity, is displaceable elastically by a said side pin pressed into said socket and is reseatable by the resilience of said latch member to engage in a groove of said side pin; said latch member further comprising a protruding portion movable to displace said abutment portion elastically out of said groove to free said side pin for removal of the blade holder from the wiper arm, a resilient arm portion connecting said abutment portion with said anchor means and a rigid arm portion connecting said abutment portion with said protruding portion so that by downward pressure on said protruding portion said resilient arm portion is elastically deflectable downward with displacement of said abutment portion from said cavity;

said recess comprising, to the opposite side of said socket, a passageway extending through said central portion to its upper side; said protruding portion comprising an upstanding finger on the other end of said latch member, said finger extending through said passageway to said upper side; said finger being connected rigidly with said abutment portion and said abutment portion being connected with said anchor means by said resilient arm portion so that by downward pressure on either said abutment portion or the upper end of said finger said abutment portion is elastically displaceable downward out of said socket;

said pocket comprising a mouth portion leading into a wider chamber thereover; said anchor means comprising resilient upward protrusions spaced apart on said latch member end and formed at their outer sides with end surfaces sloped toward ledges thereunder, said protrusions heing convergable elastically by forced movement of said sloped end surfaces into said mouth portion and being anchored in said chamber by engagement of said ledges against a wall of said chamber bordering said mouth portion.

* * * * *